United States Patent
Swift et al.

(10) Patent No.: US 12,189,966 B2
(45) Date of Patent: Jan. 7, 2025

(54) STORAGE I/O MANAGEMENT UNIT FOR SOLID-STATE DRIVES

(71) Applicant: Wisconsin Alumni Research Foundation, Madison, WI (US)

(72) Inventors: Michael Swift, Madison, WI (US); Sujay Yadalam Sudarshan, Madison, WI (US)

(73) Assignee: Wisconsin Alumni Research Foundation, Madison, WI (US)

( * ) Notice: Subject to any disclaimer, the term of this patent is extended or adjusted under 35 U.S.C. 154(b) by 0 days.

(21) Appl. No.: 18/194,929

(22) Filed: Apr. 3, 2023

(65) Prior Publication Data
US 2024/0329859 A1    Oct. 3, 2024

(51) Int. Cl.
*G06F 3/06* (2006.01)

(52) U.S. Cl.
CPC .......... *G06F 3/0622* (2013.01); *G06F 3/0637* (2013.01); *G06F 3/0679* (2013.01)

(58) Field of Classification Search
None
See application file for complete search history.

(56) References Cited

U.S. PATENT DOCUMENTS

| | | | | |
|---|---|---|---|---|
| 8,868,867 | B2 * | 10/2014 | Swanson | G06F 3/0689 711/163 |
| 10,216,927 | B1 * | 2/2019 | Steinberg | G06F 21/53 |
| 11,467,960 | B1 * | 10/2022 | Dimond | G06F 11/3037 |
| 2013/0262736 | A1 * | 10/2013 | Kegel | G06F 12/1081 711/3 |
| 2020/0310665 | A1 * | 10/2020 | Hansen | G06F 3/0622 |
| 2020/0319913 | A1 * | 10/2020 | Kumar | G06F 9/4875 |
| 2022/0308755 | A1 * | 9/2022 | Ng | G06F 9/45558 |

OTHER PUBLICATIONS

Huang, et al., "Unified Address Translation for Memory-Mapped SSDs with FlashMap," ISCA '15: proceedings of the 42nd Annual International Symposium on Computer Architecture, Jun. 13, 2015 (pp. 580-591).
Lee, et al., "A Case for Hardware-Based Demand Paging," ISCA '20: Proceedings of the ACM/IEEE 47th Annual International Symposium on Computer Architecture, May 2020, (pp. 1103-1116).
Yadalam, et al., "Swiftcore: Enabling secure and fast userspace accesses to devices," University of Wisconsin—Madison, Presentation given Mar. 11, 2022 (8 pages).
Yadalam, et al., "Swiftcore: Enabling secure and fast accesses to devices," University of Wisconsin—Madison, Poster presented Mar. 11, 2022 (1 page).

* cited by examiner

*Primary Examiner* — Edward J Dudek, Jr.
*Assistant Examiner* — Ralph A Verderamo, III
(74) *Attorney, Agent, or Firm* — Boyle Fredrickson, S.C.

(57) ABSTRACT

An I/O memory management unit operates to provide hardware moderated restrictions on access to internal I/O device addresses of I/O devices eliminating the interposition of the operating system in such data transfers. As well as providing read/write permissions, the I/O memory management unit can perform address translation for virtualization and may be the combined with the functions of an IOMMU for managing physical addresses.

16 Claims, 3 Drawing Sheets

STORAGE I/O MANAGEMENT UNIT FOR SOLID-STATE DRIVES

STATEMENT REGARDING FEDERALLY SPONSORED RESEARCH OR DEVELOPMENT

This invention was made with government support under 1900758 awarded by the National Science Foundation. The government has certain rights in the invention.

BACKGROUND OF THE INVENTION

The present invention relates generally to computer architectures and in particular to an architecture providing high-speed data transfer between application programs and solid-state drives.

Modern storage devices such as solid-state drives (SSD) provide low latency (less than 10 μs) and high-bandwidth (multiple gigabytes per second). At these speeds, the execution speed of the computer operating system becomes a bottleneck for data transfer, contributing more than 60% of the total latency of the data transfer, for example, of a typical data page.

One method of reducing the operating system overhead is to bypass the operating system, for example, using special drivers such as SPDK (storage performance development kit) which allow the application to initiate a block access in the device and a direct memory access to the host. A disadvantage to this approach is that, by bypassing the operating system, important restrictions enforced by the operating system and intended to limit access to storage by malicious programs are lost making the computer less secure.

SUMMARY OF THE INVENTION

The present invention facilitates the transfer of data between solid-state drives, or other I/O devices handling data, and a processor by employing a storage input/output memory management unit (SIOMMU) that can control access to high-speed, solid-state memory using meta-data (page tables) preloaded by the operating system. Importantly, these permissions are based on addresses of the I/O device (e.g., block addresses) rather than memory addresses as is typically done with a memory management unit. This preloaded meta-data allows low latency data transfer at hardware speeds without further involvement by the operating system. In some embodiments, the SIOMMU can provide address translation permitting virtualization. The SIOMMU may also implement conventional IOMMU (I/O memory management unit) functionality for hardware savings.

More specifically, one embodiment of the present invention provides an I/O memory management unit for use in a computer architecture having a processor communicating with a main computer memory, having memory addresses, and an I/O device, having I/O device addresses. The I/O memory management unit operates to: (a) receive from the I/O device an I/O device address previously sent to the I/O device in a request from the processor; (b) communicate with a page table held in the main computer memory to match the I/O device address to permission data authorizing or not authorizing access to the I/O device address; and (c) output the permission data to the I/O device.

It is thus a feature of at least one embodiment of the invention to provide a simple, processor-side circuit that can manage data transfer permissions based on I/O device storage addresses using page table storage in high-speed computer memory without time-consuming operating system intervention.

The I/O device may be a solid-state drive holding data arranged in blocks and the I/O device addresses may be block addresses.

It is thus a feature of at least one embodiment of the invention to provide a low latency interface with solid-state drives offering MMU type protection.

The I/O device address may be a virtual address and the communication with the page table may provide a physical I/O device address different from the I/O device address, linked to the I/O device address and indicating a physical block of the solid-state drive associated with the I/O device address.

It is thus a feature of at least one embodiment of the invention to permit a virtualization of block addresses.

The I/O memory management unit may further receive an application identifier previously sent to the I/O device in a request from the processor and communicate with the page table to match the I/O device address and the application identifier to an I/O device address and application identifier-linked permission data indicating a permission to access the I/O device address of the I/O device and used to provide the permission data to the I/O device.

It is thus a feature of at least one embodiment of the invention to provide a system that is process-aware to prevent collisions during virtualization.

The permission may be represented either by returning a valid address of the solid-state drive or by returning non-address permission data.

It is thus a feature of at least one embodiment of the invention to provide either conventional read or write permissions or absence of a data entry to indicate that the I/O device address should not be used.

The I/O memory management unit may further execute to communicate with a page table cache holding portions of the page table to match the I/O device address to I/O device address-linked permission data; and when there is a matching in the portions, provide the permission data from the portions and otherwise provide the permission data from the page table.

It is thus a feature of at least one embodiment of the invention to implement a cache structure to further speed I/O device address evaluation.

In some embodiments, the I/O memory management unit may further: (d) receive from the I/O device a memory address for data transfer with the I/O device, (e) communicate with a second page table held in the main computer memory to match the memory address to second permission data authorizing or not authorizing access to the memory address; and (f) output the permission data to the I/O device.

It is thus a feature of at least one embodiment of the invention to combine the hardware of the I/O memory management unit with the SIOMMU for greater efficiency.

The I/O memory management unit may further receive from the I/O device an address previously sent to the I/O device in a request from the processor including a file transfer bit indicating whether the address is an I/O device address or a memory address and reviews the page table or second page table depending on the file transfer bit.

It is thus a feature of at least one embodiment of the invention to provide a simple method of sharing resources between the I/O memory management unit and the SIOMMU.

These particular objects and advantages may apply to only some embodiments falling within the claims and thus do not define the scope of the invention.

DETAILED DESCRIPTION OF THE PREFERRED EMBODIMENT

Figure 1:
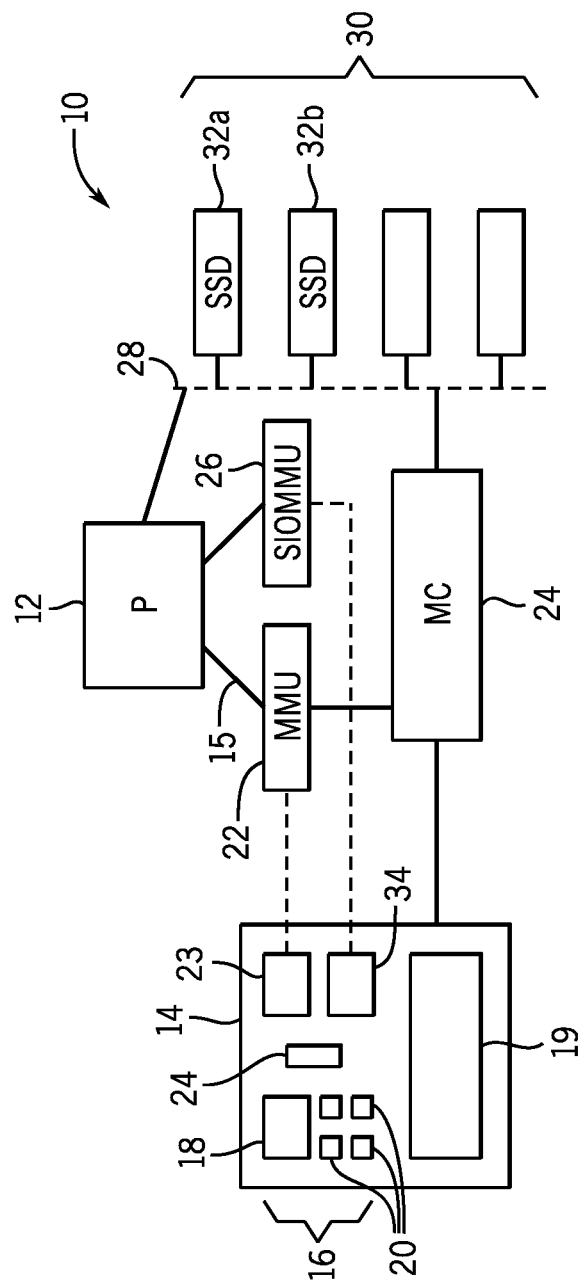
FIG. 1 is a block diagram of a computer architecture employing a storage I/O memory management unit (SIOMMU) of the present invention communicating with I/O devices including a solid-state drive.

Referring now to FIG. 1, an electronic computer 10 may provide for one or more processors 12 operating in conjunction with a main computer memory 14 to execute one or more programs 16 including generally a kernel or operating system 18 and various application programs 20 and data storage 19. The main memory 14 will normally include volatile solid-state memory, for example, DRAM.

The processor 12 may communicate with the main memory 14 using a memory bus 15 communicating, under the control of a memory management unit (MMU) 22 with a memory controller 24. As is generally understood in the art, the MMU 22 provides a mechanism for translating virtual memory addresses to physical memory addresses for virtualization of the main memory 14 and to set read and write permissions for particular physical memory addresses thereby controlling access to those addresses. In this regard, the MMU 22 may communicate with the main memory 14 for access to a page table 23 linking physical and virtual memory addresses and providing other permission and status bits as is generally understood in the art. The memory controller 24 operates to provide memory control features such as address decoding and refreshing of DRAM.

The processor 12 may also communicate over an I/O bus structure 28, separate from the memory bus 15, with various I/O devices 30, including but not limited, for example, to human interface elements such as graphic displays, as well as network interface cards, audio interface cards and the like. Importantly, the I/O devices 30 will include at least one and sometimes several solid-state drives 32a and 32b functionally operating like a magnetic disk drive and typically employing a nonvolatile architecture, for example, having an average read latency of less than 20 μs at 0.5 GB per second and a capacity in excess of 100 GB. Example solid-state drives 32 include not only transistor based architectures such as NAND memory but also phase change memories, spin-torque MRAMs, and memristor memories. An example solid-state drive 32 suitable for use with the present invention are commercially available under the trade name of Optane NVMe from Intel Corporation.

These I/O devices 30 and/or the SIOMMU 26 may also communicate with the memory controller 24 to implement direct memory access of the main memory 14.

The SIOMMU 26 also communicates with the main memory 14 for access to a second page table 34 operating similarly to page table 23 with differences in content as will be discussed in greater detail below. Each of the page tables 23 and 34 may have multiple levels as is understood in the art.

The data of the page tables 34 is created and then loaded by the operating system 18 during a file open process, in many but not all cases, concluding the involvement of the operating system 18 in the transfer of data of that file, typically until the file closes. The operating system 18 allocates a virtual space in the computer memory 14 (virtual) equal to or exceeding the file size. The data of the page table 34 is then loaded such as to map an application identifier (PASID) of the application 20 opening the file and solid-state drive block address (starting virtual block addresses converted from a file path name) to the allocated virtual space in the computer memory 14 and to set read/write permissions as will be discussed below and to set a device ID that will be discussed below, in this case identifying a particular solid-state drive 32. In this regard, the PASID may serve as an index to the page table 34 and thus exists logically but is not a table entry. More generally, the operating system 18 handles file metadata operation such as open( ) close( ) and appends while the SIOMMU 26 will handle data operation such as read( ) and write( ) without operating system involvement.

Figure 2:
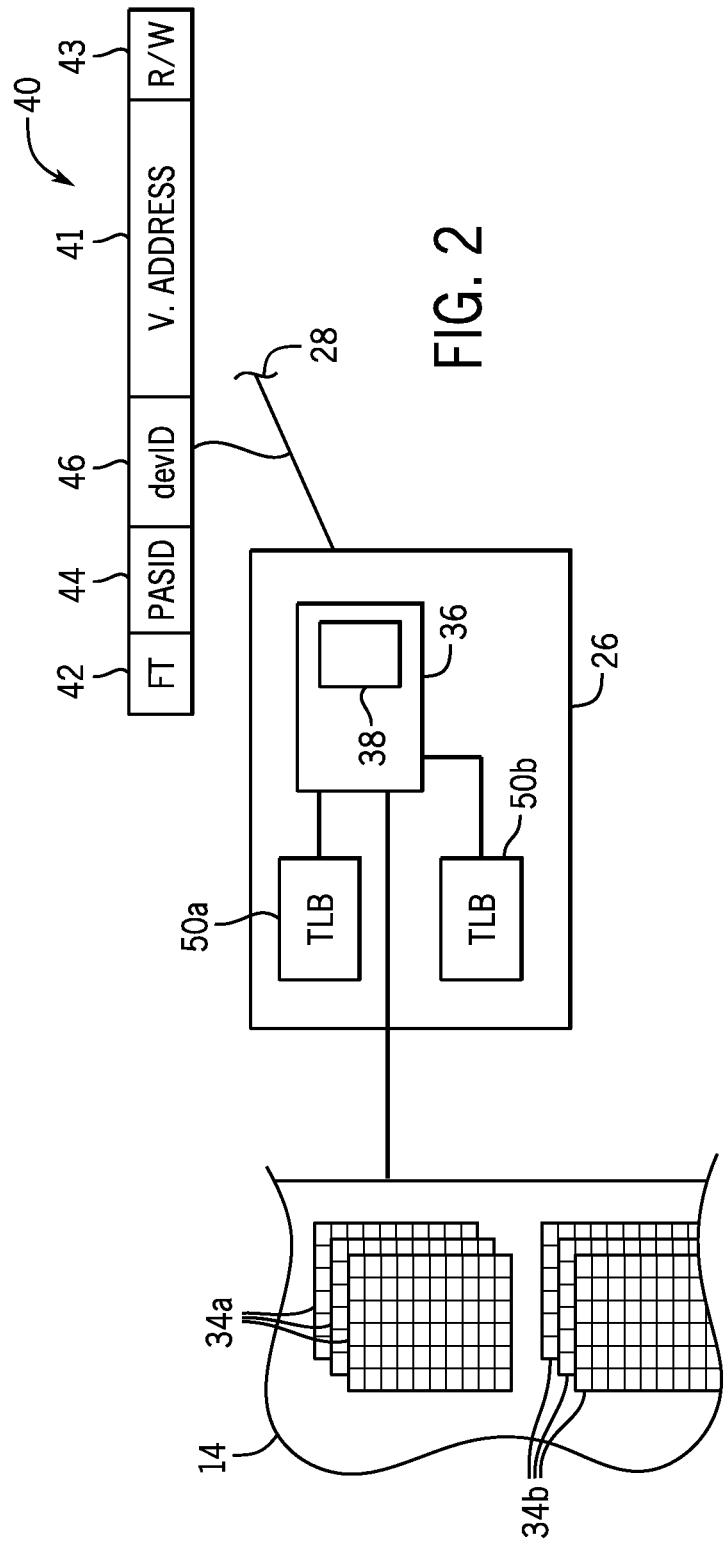
FIG. 2 is a detailed view of the structure of the SIOMMU having logic circuitry for receiving requests from application programs (via a solid-state drive) and communicating with an internal translate look aside buffer (TLB) and externally stored page tables.

Referring now also to FIG. 2, the SIOMMU 26 may provide for control logic circuitry 36 executing an implicit program 38, implemented in integrated circuitry, to receive an access requests 40 from the SSDs 32 (initiated by the processor 12 executing the libraries or drivers 21). Generally, then, data transfer to or from the solid-state drives 32 using the SIOMMU 26 will be implemented by a combination of the SIOMMU 26 and driver and library programs 21 in the main memory 14. The SIOMMU 26 may provide a first translation lookaside buffer 50a serving as a cache for a page table 34a for evaluating I/O device addresses, that is, internal addresses of I/O devices 30 describing stored data in those devices. The SIOMMU 26 may further communicate with a second translation lookaside buffer 50b serving as a cache for a page table 34b for evaluating memory addresses, that is addresses of the main memory 14

The access request 40 may be one of two types designated by an FT bit 42 in the request 40. The first type, for example, indicated by an FT bit of one is intended to evaluate (determine permissions and translate between physical and virtual I/O device addresses) a request of an I/O device 30, for example a block address of an SSD device 32. The second type, for example, indicated by an FT bit of zero, is intended to evaluate (determine permissions and translations) a request for a memory address of the main memory 14. Typically, a direct memory transfer between an SSD device 32 and main memory 14 may require both an evaluation of I/O device addresses and memory addresses to establish the endpoints of the data transfer.

The access request 40 may also include a process address space identifier (PASID) analogous to the ASID used in conventional MMUs and uniquely identifying a process of a particular application program 20. In addition, the access request 40 may provide a device ID 46 distinguishing between the particular solid-state drives 32a and 32b. Further, as noted above, the access request 40 may provide an address, for example, a virtual block address that will be mapped into a physical block of the solid-state drive 32 identified by the device ID 46 (when the FT bit 42 is set) or a virtual memory address that will be made to a physical memory address of the main memory 14 (when the FT bit 42 is reset). Finally, the request 40 may include a read/write indication 43 of whether this request is for a reading or writing of data with respect to the requester.

Figure 4:
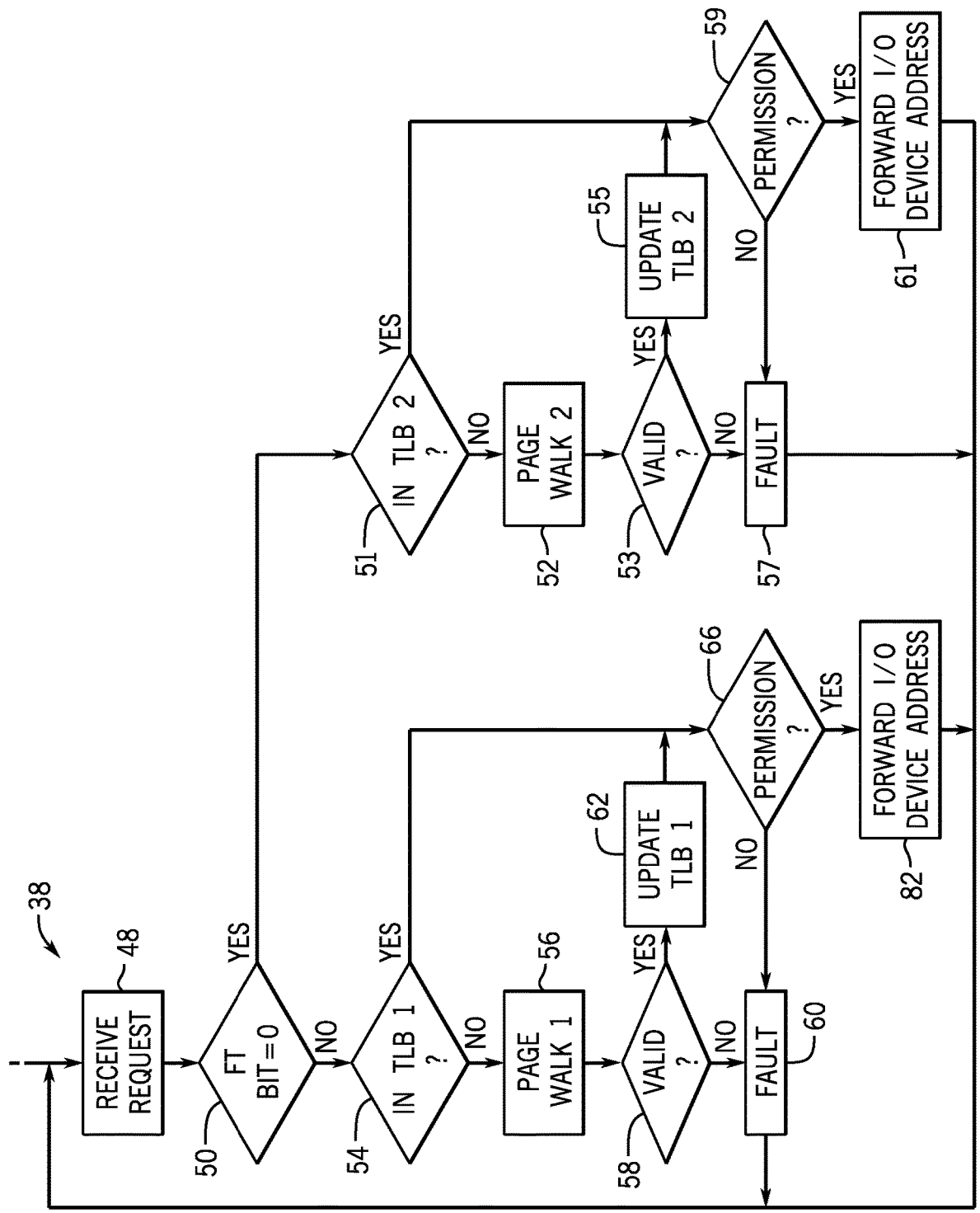
FIG. 4 is a flowchart of the of the logic circuitry of the SIOMMU shown in FIG. 2.

Referring now also to FIG. 4, upon receipt of the request 40 as indicated by process block 48, the FT bit 42 is evaluated to determine the type of address being received in the access request 40. If the FT bit is set or one, the program 38 proceeds to decision block 50 and the logic circuitry 36 of the SIOMMU 26 consults a translate look aside buffer 50*a* (shown in FIG. 2) holding a cached portion of the page table 34*a* of I/O device addresses to attempt to find a matching of an entry with the PASID 44, and the device ID 46 of the request 40. The TLB 50*a*, by providing a local caching of page table information in the circuitry of the SIOMMU 26, helps reduce the latency or delay in obtaining information from the page table 34 which would otherwise require accessing main memory 14 outside of the integrated circuit of the SIOMMU 26.

If an entry is not found, as determined a decision block 54, at process block 56 a page walk through the page table 34*a* is conducted essentially operating to review the data of page table 34 for a matching PASID 44 and the device ID 46. If a match is not obtained in the page table 34*a*, determined by decision block 58, a fault is indicated at process block 60 and the program 38 loops back to process block 48.

Importantly, the fault prevents the requested data transfer from being handled by the SIOMMU 26 and is referred to the operating system 18 via the application program 20 or a driver library 21 for handling, for example, in as is done with a conventional page fault. The fault may be handled in a number of different ways including, for example, by simply faulting and preventing data transfer or by implementing the data transfer by defaulting to the operating system 18 using conventional methods, or causing the operating system 18 to add data to the page table 34 in a remapping operation and referring the transfer again to the SIOMMU 26. The preferred handling of the fault may be signaled by a unique fault code.

In the event that a match of the request 40 is found in the page table 34*a*, but not previously in the TLB 50*a*, the TLB 50*a* may be updated as indicated by process block 62.

Importantly, the TLB 50*a* and TLB 50*b* may be implemented as a single table in a combined device greatly simplifying and improving the performance of address lookups.

In both cases where a match of the request 40 is found either in the page table 34 or in the TLB 50 (at decision block 58 or decision block 54), the program 38 proceeds to decision block 66 to assess whether the requested transfer will be permitted according to the permissions of the associated matched data.

Figure 3:
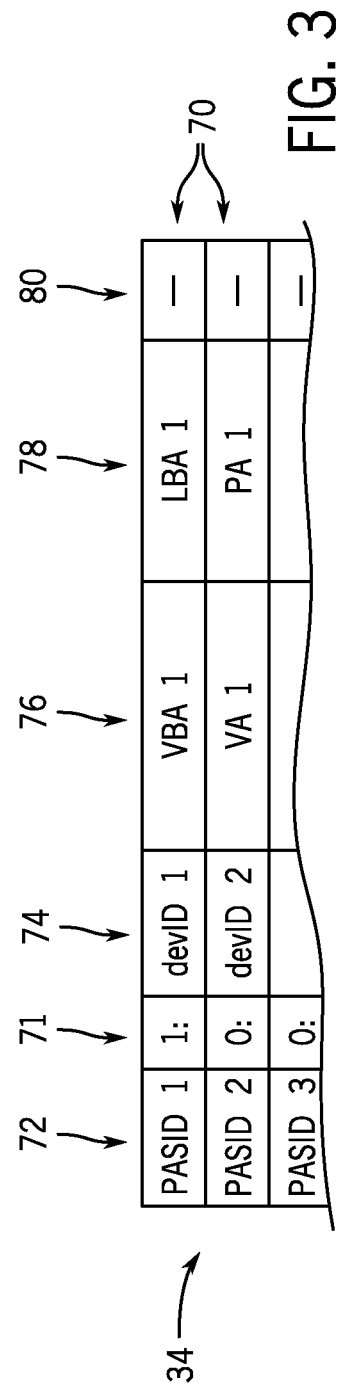
FIG. 3 is a fragmentary view of the logical structure of several page table entries showing one entry for a solid-state drive and a separate entry for other I/O devices.

Referring to FIG. 3, the matching process of decision blocks 54 and 58 reviews file table entries 70 (either in the page table 34 or cached in the TLB 50) which include an FT field 71, a PASID field 72, a device identifier field 74, a virtual block address field 76, a physical block address field 78 and read/write permission field 80. It should be understood that the file table 70 is depicted logically and thus could be implemented with different data structures, from one or more tables, with different indexing or addressing, or in one or more steps to accomplish the same purpose. For example, the SIOMMU 26 may check to see if there is an entry with a matching PASID, FT bit, and address. If there is a match, it may then compare the device ID field of the entry against the device ID of the request, and fail if they don't match and succeed if they do. A match is indicated at decision block 58 or decision block 54 if the FT bit 42 of the request matches the FT field 71 of the file table entry 70 and the PASID 44 of the request 40 matches the PASID field 72 of the file table entry 70, and the device ID 46 of the request 40 matches the device identification field 74 of the file table entry 70 and the address 41 of the request 40 matches the virtual block address field 76 of the file table entry 70.

At decision block 66, permission is imputed if there is a valid physical block address 78 in the matching file table entry 70 and if the read/write permission field 80 holds data indicating that the desired access is permitted (either reading or writing).

It will be understood that the fault condition of process block 60 occurs because of a lack of permission imputed from any of there being no matching file table entry 70 or when there is a matching table entry 70 but permission not being granted per read/write permission field 80. The fault mechanisms allow the application program 20 to bypass the SIOMMU in favor of the operating system when low latency is not required, simply by setting the permissions to deny transfer, further minimizing the necessary size of the SIOMMU TLBs 50.

When permission is granted as indicated by process block 82, the matching physical block address 78 is provided to the I/O device 30 to initiate a physical storage access and then memory transfer via the memory controller 24.

Referring still to FIG. 4, if at decision block 50, the FT bit 42 is zero, then a separate set of page table entries 34*b* are reviewed relating to memory addresses not I/O device addresses but otherwise logically equivalent. In this process, process block 51 corresponds generally to process block 56 but relative to TLB 50*b* and process blocks 52 and 53 correspond to process blocks 56 and 58 but relative to page table 34*b*. The remaining process decision blocks 55, 57, 59 and 61 correspond generally to process box 62 60, 66 and 82 as discussed above with the differences just noted. At process block 61 a memory address is output.

As noted above, the SIOMMU 26 will generally comprise a single integrated circuit with on-chip memory for the TLB 50 in order to provide a substantial speed advantage over implementing these functions with the operating system 18. The SIOMMU 26 may be separate from or incorporated into the processors 12. It will be generally understood that the present invention is not limited to solid-state drives but can apply generally to I/O devices addressed as such and having internal addressed sources of data, for example, a network card having addressed ports.

Certain terminology is used herein for purposes of reference only, and thus is not intended to be limiting. For example, terms such as "upper", "lower", "above", and "below" refer to directions in the drawings to which reference is made. Terms such as "front", "back", "rear", "bottom", and "side", describe the orientation of portions of the component within a consistent but arbitrary frame of reference which is made clear by reference to the text and the associated drawings describing the component under discussion. Such terminology may include the words specifically mentioned above, derivatives thereof, and words of similar import. Similarly, the terms "first", "second" and other such numerical terms referring to structures do not imply a sequence or order unless clearly indicated by the context.

When introducing elements or features of the present disclosure and the exemplary embodiments, the articles "a", "an", "the" and "said" are intended to mean that there are one or more of such elements or features. The terms "comprising", "including", and "having" are intended to be inclusive and mean that there may be additional elements or features other than those specifically noted. It is further to be understood that the method steps, processes, and operations described herein are not to be construed as necessarily requiring their performance in the particular order discussed or illustrated, unless specifically identified as an order of performance. It is also to be understood that additional or alternative steps may be employed.

It is specifically intended that the present invention not be limited to the embodiments and illustrations contained herein and the claims should be understood to include modified forms of those embodiments including portions of the embodiments and combinations of elements of different embodiments as come within the scope of the following claims. All of the publications described herein, including patents and non-patent publications, are hereby incorporated herein by reference in their entireties.

To aid the Patent Office and any readers of any patent issued on this application in interpreting the claims appended hereto, applicants wish to note that they do not intend any of the appended claims or claim elements to invoke 35 U.S.C. 112(f) unless the words "means for" or "step for" are explicitly used in the particular claim.

What we claim is:

1. An I/O memory management unit for use in a computer architecture having a processor communicating with a main computer memory having memory addresses and an I/O device having I/O device addresses, the I/O memory management unit comprising circuitry operating to:
   (a) receive from the I/O device an I/O device address previously sent to the I/O device in a request from the processor;
   (b) communicate with a data structure held in the main computer memory to match the I/O device address to permission data authorizing or not authorizing access to the I/O device address;
   (c) output the permission data to the I/O device;
   (d) receive from the I/O device a memory address for data transfer with the I/O device;
   (e) communicate with a second data structure held in the main computer memory to match the memory address to second permission data authorizing or not authorizing access to the memory address; and
   (f) output the second permission data to the I/O device.

2. The I/O memory management unit of claim 1 wherein the I/O device is a solid-state drive holding data arranged in blocks and the I/O device addresses are block addresses.

3. The I/O memory management unit of claim 2 wherein the I/O device address is a virtual address and wherein the communication with the data structure provides a physical I/O device address different from the I/O device address, linked to the I/O device address and indicating a physical block of the solid-state drive associated with the I/O device address.

4. The I/O memory management unit of claim 2 wherein the I/O memory management unit further receives an application identifier and communicates with the data structure to match the I/O device address and the application identifier to I/O device address and application identifier linked permission data indicating a permission to access the I/O device address of the I/O device and used to provide the permission data to the I/O device.

5. The I/O memory management unit of claim 1 wherein the permission data is the existence of a matching entry in the data structure.

6. The I/O memory management unit of claim 1 wherein the permission data is a field in an existing data structure entry.

7. The I/O memory management unit of claim 1 wherein the I/O memory management unit further executes to:
   communicate with a data structure cache holding portions of the data structure to match the I/O device address to I/O device address-linked permission data; and when there is a matching in the portions, provide the permission data from the data structure cache and otherwise provide the permission data from the data structure held in main computer memory.

8. The I/O memory management unit of claim 1 wherein the memory address is a virtual memory address and wherein the communication with the second data structure provides a physical memory address different from the virtual physical address, linked to the virtual memory address and indicating a physical address of the main memory associated with the virtual physical address.

9. The I/O memory management unit of claim 1 wherein the I/O memory management unit further executes to:
   receive from the I/O device an address previously sent to the I/O device in a request from the processor including a file transfer bit indicating whether the address is an I/O device address or a memory address and reviews the data structure or second data structure depending on the file transfer bit.

10. The I/O memory management unit of claim 1 wherein the main computer memory is random access memory and the solid-state drive is nonvolatile solid-state memory.

11. A computer architecture comprising:
   one or more electronic processors;
   a main computer memory including solid-state memory holding an operating system and application program;
   at least one solid-state drive accessible by the operating system using a file system;
   a I/O memory management unit comprising an integrated circuit executing to:
   (a) receive from an I/O device an I/O device address previously sent to the I/O device in a request from the one or more electronic processors;
   (b) communicate with a data structure held in the main computer memory to match the I/O device address to permission data authorizing or not authorizing access to the I/O device address;
   (c) outputting the permission data to the I/O device;
   (d) receiving from the I/O device a memory address for data transfer with the I/O device;
   (e) communicating with a second data structure held in the main computer memory to match the memory address to second permission data authorizing or not authorizing access to the memory address; and
   (f) outputting the second permission data to the I/O device.

12. The computer architecture of claim 11 wherein the one or more processors communicates with the main computer memory over a memory bus and the processor communicates with the at least one solid-state drive over an I/O bus different from the memory bus.

13. The computer architecture of claim 11 wherein the I/O memory management unit further executes to convert virtual addresses from the one or more processors received over the memory bus to physical addresses of the main memory.

14. The computer architecture of claim 11 wherein the I/O device address is a virtual address and wherein the communication with the data structure provides a physical I/O device address different from the I/O device address, linked to the I/O device address and indicating a physical block of the at least one solid-state drive associated with the I/O device address.

15. A method of accessing an I/O device in a computer architecture having a processor communicating with a main computer memory having memory addresses and an I/O device having I/O device addresses, the method comprising:
  (a) receiving from the I/O device an I/O device address previously sent to the I/O device in a request from the processor; and
  (b) communicating with a data structure held in the main computer memory to match the I/O device address to permission data authorizing or not authorizing access to the I/O device address;
  (c) outputting the permission data to the I/O device
  (d) receiving from the I/O device a memory address for data transfer with the I/O device;
  (e) communicating with a second data structure held in the main computer memory to match the memory address to second permission data authorizing or not authorizing access to the memory address; and
  (f) outputting the second permission data to the I/O device.

16. The method of claim 15 wherein the I/O device address is a virtual address and wherein the communication with the data structure provides a physical I/O device address different from the I/O device address, linked to the I/O device address and indicating a physical block of a solid-state drive associated with the I/O device address.

* * * * *